June 16, 1953 W. B. WESTCOTT, JR 2,642,278
SHOCK STRUT
Filed Sept. 3, 1949
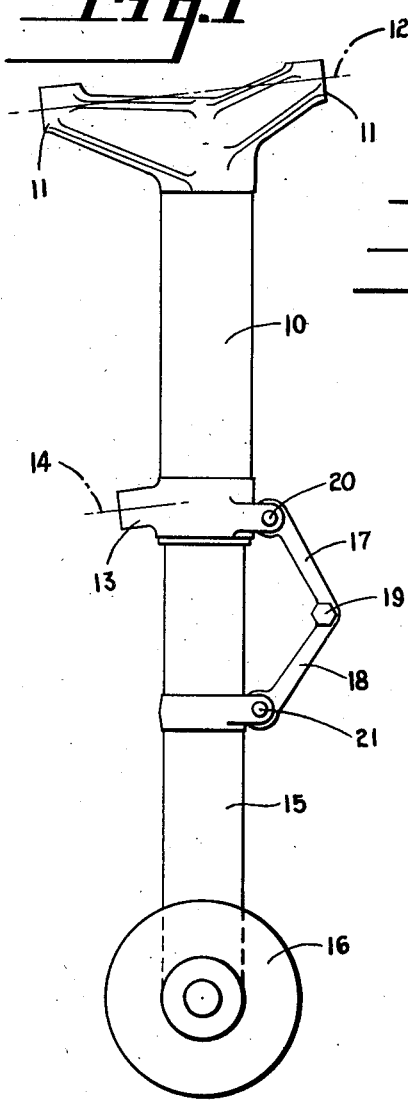
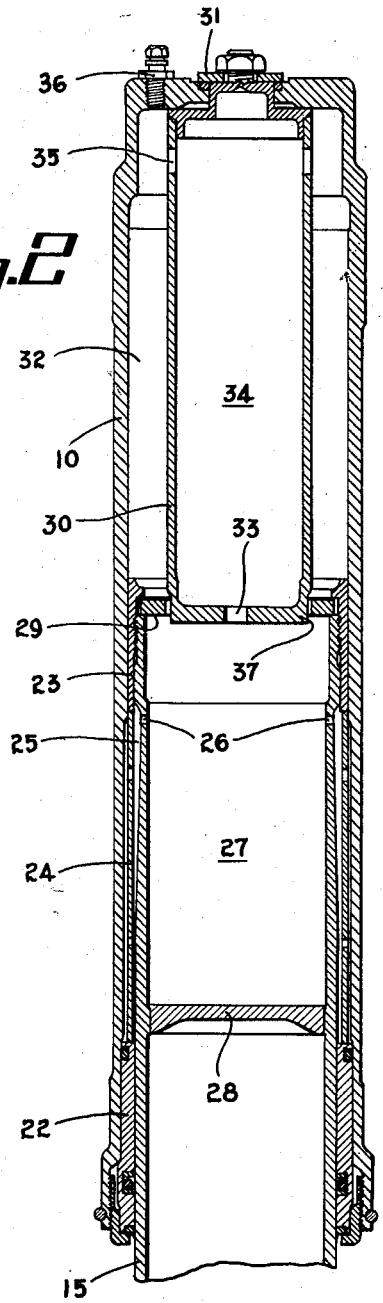
INVENTOR
WILLIAM B. WESTCOTT JR.
BY
ATTORNEY Patented June 16, 1953

2,642,278

UNITED STATES PATENT OFFICE 2,642,278

SHOCK STRUT

William B. Westcott, Jr., Columbus, Ohio, assignor to Curtiss-Wright Corporation, a corporation of Delaware Application September 3, 1949, Serial No. 113,941

7 Claims. (Cl. 267—64)

This invention relates to oleo shock struts adapted for use in aircraft landing gear.

In conventional oleo shock struts a metering pin is employed to control the area of a metering orifice which connects a liquid filled chamber with a chamber containing liquid and compressed air, the diameter of the metering pin being varied along its length to thereby effect variation in the shock absorbing effect of the strut at different points in its stroke. Determination of the pin design which will result in the best absorption of shocks imposed on the gear during actual landing, and also during ground runs of the aircraft, is usually accomplished by making a series of drop tests of the strut, and usually a large amount of time and expense are involved in this work.

Despite this there are difficulties which arise in actual operation due to the fact that peak loads on the strut which are expected to be encountered only during actual landing, when the strut is nearly fully extended, may actually occur during ground runs, when the strut is in a partially contracted condition as the result of supporting all or most of the static load of the aircraft. Under such unexpected peak loads excessive internal pressures sometimes develop and cause failure of the struts.

The primary object of the present invention is to provide an oleo strut which will have satisfactory shock absorbing characteristics regardless of where in its stroke a peak load may occur. To this end a hollow plunger is extended from the head of the strut cylinder through an opening in the head of the strut piston, the side wall of the plunger being yieldable radially and cooperating with the encircling part of the piston head in providing a variable area metering passage which connects a liquid containing chamber in the piston with a chamber in the cylinder containing liquid and compressed air. The arrangement is such that increase of pressure in the piston chamber, resulting from increase in the load on the strut, will be effective at any point in the stroke of the piston to compress the portion of the plunger encircled by the piston head and thereby increase the area of the metering passage. In this way the need for a metering pin is obviated, as is also the need for determining exactly, by drop testing or otherwise, the most favorable areas of the metering orifice for different positions of extension of the strut.

The invention further contemplates making the portion of the piston head through which the plunger extends in the form of a ring that is mounted on the piston body in such a manner that it may have limited radial motion relative to the body. With this arrangement only the inner face of the ring must be accurately ground to match the outer surface of the plunger, and there is no need for grinding the inner surface of the piston body itself nor for maintaining exact concentricity between the plunger and the cylinder or between the plunger and the piston, so that manufacturing costs are materially reduced.

The foregoing and other objects and advantages will appear from the following description of the typical embodiment of the invention shown in the accompanying drawings wherein:

Fig. 1 is a side elevation of the strut and the associated aircraft landing wheel; and Fig. 2 is a vertical sectional view taken diametrically through the fluid containing portion of the strut.

As shown in the drawings the strut comprises a cylinder 10 provided at its upper end with bosses 11 by which it is pivoted upon axis 12 to the frame of an aircraft (not shown), and provided at its lower end with a boss 13 by which it is pivoted on axis 14 to a folding brace or other part of the landing gear retracting mechanism of the aircraft. Telescoped within the cylinder 10 is the piston 15 of the strut, which, at its lower end, mounts landing wheel 16. The piston is prevented from turning in the cylinder by links 17 and 18 which are pivotally connected to each other at 19, and to the cylinder and piston respectively at 20 and 21.

The body of the piston 15 slides in a bearing sleeve 22 that is secured to the cylinder adjacent the lower or open end thereof, and at its upper end the piston has screw threaded or otherwise secured thereto a bearing sleeve 23 which slides on the inner wall of the cylinder. A perforated spacing sleeve 24 is disposed in the space, designated 25, between the cylinder wall and the piston, and serves to space the bearing sleeves 22 and 23 to limit extension of the strut. Orifices 26 in the upper portion of the piston body provide for passage of fluid between the space 25 and a chamber 27 provided in the upper portion of the piston, the lower wall of the latter chamber being a plug 28.

The head of the piston comprises a ring 29 which is confined between axially spaced shoulders on the piston body, the lower of these shoulders being the upper surface of the main tubular part of the piston body and the upper of the shoulders being the lower surface of an inwardly directed flange on the bearing sleeve 23.

A slight clearance is provided between the ring and these shoulders, and also between the outer face of the ring and the adjacent cylindrical surface of the bearing sleeve 23, so that the ring may float freely in a radial direction relative to the piston body.

A thin-walled hollow plunger 30 is secured at 31 to the head of cylinder 10 and extends through the cylinder chamber 32 and through the head of the piston 10, i. e. through the ring 29, into the piston chamber 27. The bottom face or head of the plunger is provided with a metering orifice 33 through which fluid may pass between the piston chamber and the plunger interior 34. The latter is in open communication with the cylinder chamber 32 through openings 35 which are extended through the upper portion of the plunger side wall.

Oil, or other suitable hydraulic liquid, and compressed air may be introduced into the strut interior through a combination filler plug and air valve 36 that is removably secured to the cylinder head. The liquid is provided in such quantity as to completely fill the space 25 and the piston chamber 27, and to partly fill the cylinder chamber 32 and plunger chamber 34 when the strut is in its fully extended position shown in the drawings, and compressed air is introduced in sufficient amount to support the ground weight of the airplane with the bottom of the plunger the desired safe distance above the plug 28 to avoid contact therewith when the gear is subjected to dynamic loads during ground runs of the aircraft. The portion 37 of the plunger 30 that is encircled by the ring 29 when the strut is fully extended, which in the illustrated embodiment is the extreme lower end of the plunger, is of smaller diameter than the portion of the plunger thereabove, providing a relatively large fluid passage around the ring 29 in this condition of the strut. This enables the liquid levels in chambers 32 and 34 to equalize quickly whenever the strut is fully extended.

In operation, as landing load is applied to the fully extended strut, the plunger 30 displaces liquid through orifices 26 into space 25 as rapidly as it can be accommodated by the expansion of this space resulting from upward movement of bearing sleeve 23, the orifices 26 being of such size that they impose relatively little resistance to movement of the piston on this stroke during which relatively large landing loads are being applied. The up stroke of the piston is retarded primarily by the metering effect of the restricted orifice 33 and the restricted orifice between the ring 29 and the side wall portion of the plunger 30 above the reduced portion 35, and, of course, by the pressure of the compressed air in chambers 32 and 34 which increases rapidly as the piston approaches its upper limit position.

In the event of either a hard landing or of the aircraft encountering a sharp rise or bump in the runway while traveling at high speed on the ground, the resulting greatly increased pressure within piston chamber 27 is exerted upon the outer cylindrical surface of the plunger beneath the ring 29, resulting in the plunger contracting, or yielding radially inwardly and thereby increasing materially the clearance between it and the inner face of the ring. In this way the total area of the metering passages leading from piston chamber 27 is increased enough to prevent internal pressures which otherwise might damage the strut or transmit damaging loads to other parts of the aircraft. It will be seen that this action of the plunger and ring, which is somewhat similar in action to a pressure relief valve, can occur at any point in the stroke of the piston. It will also be seen that during the entire upstroke of the piston the pressure in chamber 27 will exceed that in chambers 32 and 34 so that the ring 29 will be held firmly against the undersurface of the flange of bearing sleeve 23, thus preventing any appreciable flow of liquid around the outer face of the ring.

While load is being removed from the strut, so that the internal pressure (plus the static weight of the piston and landing wheel when the aircraft is in flight) effects a down stroke of the piston, the pressure is higher in chambers 32 and 34 than in piston chamber 27 so that the ring 29 is held tightly against the upper edge surface of the main tubular member of the piston body. During the downstroke no appreciable dynamic loads are exerted and hence no pressure relief function is accomplished by the ring and plunger, although in determining the rate of fluid flow from chambers 32 and 34 to chamber 27 account must be taken of the clearance between the ring and plunger. When the weight of the aircraft is entirely removed from the strut and the piston approaches its lowermost position the load acting to extend the strut is greatly reduced, and under this condition the passages 26 which restrict flow of liquid from space 25 into piston chamber 27 are effective to snub extension of the strut.

Due to the relatively large circumference of the plunger, the area of the passage between the ring and the plunger varies rapidly with change in diameter of either of these two parts. By reason of this characteristic the ring and the plunger may advantageously be made of metals or metal alloys having different temperature coefficients of expansion, so chosen that the total area of the metering passages leading from piston chamber 27 into chambers 32 and 34 will vary with temperature in a direction and to a degree which will at least approximately compensate for change with temperature in the viscosity of the particular liquid that is used.

Preferably, the orifice 33 is smaller in area than the normal area of the orifice formed by the ring 29 and the plunger 30. When the strut is loaded suddenly, a large pressure differential is created between the chamber 27 and the chambers 32—34. High pressure is exerted on the outside of the plunger 30 below the ring 29 while low pressure exists in chambers 34 and 32 above the ring 29. Since the wall of the plunger is purposely made thin enough to be flexible and to yield inwardly due to the pressure exerted on the outside of the plunger, the diameter of the plunger is decreased, increasing the area of the annular orifice between the ring 29 and the plunger, allowing faster flow of fluid therethrough while the high loading on the strut persists. If desired, the orifice 33 and the passages 35 can be eliminated whereby all fluid flow takes place between the ring 29 and the plunger 30.

It will be appreciated that the pressure relief effect of the plunger and ring can be changed by varying the thickness of the tubular side wall of the plunger and the material of which it is made. For most landing gear designs the wall thickness can be the same throughout the length of the plunger, but the wall thickness can of course be varied, if desired, to vary the shock absorption characteristics at different points along the stroke of the strut. Similarly the metering effect of the passage between the ring and plunger may be varied, if desired, by changing the clearance between the ring and plunger at different points along the latter.

It will be understood that still other changes in the form and arrangement of the component parts will readily occur to those skilled in the art and may be made without departing from the spirit of the present invention or from the scope of the appended claims.

I claim:

1. In a shock strut, a cylinder adapted to contain liquid and compressed air, a chambered piston slidable axially in said cylinder, the body of the piston being spaced from the cylinder wall by a bearing provided on the piston adjacent the head thereof and by a bearing provided on the cylinder adjacent the open end thereof, a hollow plunger supported by and disposed within the cylinder and extending into the chamber of the piston, the end of the plunger within the piston having a metering passage for liquid connecting the interior of the plunger with the piston chamber, the head of the piston comprising a ring supported by and between axially spaced shoulders on the piston body for limited radial movement relative to said body, and the inner face of said ring encircling and cooperating with the outer surface of the plunger to provide a metering passage for liquid between the cylinder chamber and the piston chamber, the plunger being yieldable in a radially inward direction upon increase in fluid pressure on the outer surface thereof incident to increase of load applied to the strut, to decrease the plunger diameter and thereby to increase the area of the last-mentioned passage, the portion of the plunger encircled by the ring when the strut is fully extended being of reduced diameter whereby said last-mentioned passage then has increased area, passage means for liquid and air connecting the interior of the plunger with the cylinder chamber, and metering passage means for liquid connecting the piston chamber with the space between the cylinder and piston confined between said bearings.

2. In a shock strut, a cylinder adapted to contain liquid and compressed air, a chambered piston slidable axially in said cylinder, the body of the piston being spaced from the cylinder wall by a bearing provided on the piston adjacent the head thereof and by a bearing provided on the cylinder adjacent the open end thereof, a hollow plunger supported by and disposed within the cylinder and extending into the chamber of the piston, the end of the plunger within the piston having a metering passage for liquid connecting the interior of the plunger with the piston chamber, the head of the piston comprising a ring supported by and between axially spaced shoulders on the piston body for limited radial movement relative to said body, and the inner face of said ring encircling and cooperating with the outer surface of the plunger to provide a metering passage for liquid between the cylinder chamber and the piston chamber, the plunger being yieldable in a radially inward direction upon increase in fluid pressure on the outer surface thereof incident to increase of load applied to the strut, to decrease the plunger diameter and thereby to increase the area of the last mentioned passage, passage means for liquid and air connecting the interior of the plunger with the cylinder chamber, and metering passage means for liquid connecting the piston chamber with the space between the cylinder and piston confined between said bearings.

3. In a shock strut, a cylinder and a chambered piston slidable therein, a hollow plunger supported by and disposed within the cylinder and extending into the chamber of the piston, the end of the plunger within the piston having a metering passage connecting the plunger interior with the piston chamber, the head of the piston comprising a ring supported by and between axially spaced shoulders on the piston body for limited radial movement relative to said body, the inner face of the ring encircling and cooperating with the outer surface of the plunger side wall to provide a metering passage connecting the piston chamber with the cylinder chamber, the plunger being yieldable in a radially inward direction to thereby decrease the plunger diameter and increase the area of the last-mentioned passage, upon increase of pressure on the outer surface of the plunger incident to increase of the load applied to the strut, the portion of the plunger encircled by said ring when the strut is fully extended being of reduced diameter, whereby said last-mentioned passage then has increased area, and passage means connecting the plunger interior with the cylinder chamber.

4. In a shock strut, a cylinder and a chambered piston slidable therein, a hollow plunger supported by and disposed within the cylinder and extending into the chamber of the piston, the end of the plunger within the piston having a metering passage connecting the plunger interior with the piston chamber, the head of the piston having an opening passing the plunger and cooperating therewith to provide a metering passage connecting the piston chamber with the cylinder chamber, the plunger being yieldable in a radially inward direction to thereby decrease the plunger diameter and increase the area of the last-mentioned passage upon increase of pressure on the outer surface of the plunger incident to increase of the load applied to the strut, the portion of the plunger encircled by the piston head with the strut is fully extended being of reduced diameter whereby said last-mentioned passage then has increased, and passage means connecting the plunger interior with the cylinder chamber.

5. In a shock strut, a cylinder and a chambered piston slidable therein, a hollow plunger supported by and disposed within the cylinder and extending into the chamber of the piston, the end of the plunger within the piston having a metering passage connecting the plunger interior with the piston chamber, the head of the piston having an opening passing the plunger and cooperating therewith to provide a metering passage connecting the piston chamber with the cylinder chamber, the plunger being yieldable in a radial direction to decrease the plunger diameter and increase the area of the last-mentioned passage upon increase of pressure on the outer surface of the plunger incident to increase of the load applied to the strut, and the portion of the plunger encircled by said annular formation when the strut is fully extended being of reduced diameter whereby said last-mentioned passage then has increased area.

6. In a shock strut, a cylinder and a chambered piston slidable therein, a hollow plunger supported by and disposed within the cylinder and extending into the chamber of the piston, the end of the plunger within the piston having a metering passage connecting the plunger interior with the piston chamber, the head of the piston having an opening passing the plunger and cooperating therewith to provide a metering passage connecting the piston chamber with the cylinder chamber, and the plunger being yieldable in a radial direction to decrease the plunger diameter and increase the area of the last-mentioned passage upon increase of pressure on the outer surface of the plunger incident to increase of the load applied to the strut.

7. In a shock strut, a cylinder and a chambered piston slidable therein, a hollow member extending from the head of the cylinder and through the head of the piston into the piston chamber, the head of the piston comprising a ring supported by and between axially spaced shoulders on the body of the piston for limited movement radially of said body, and the inner surface of said ring encircling and cooperating with the outer surface of said hollow member to provide a metering passage between the cylinder chamber and the piston chamber, the hollow member being yieldable in a radially inward direction upon increase of fluid pressure on the outer surface thereof incident to increase of load applied to the strut, to thereby decrease the member diameter and increase the area of said passage, and the diameter of said hollow member being different at different points along the length thereof, to vary the area of said passage in different positions of extension of the strut.

WILLIAM B. WESTCOTT, Jr.

References Cited in the file of this patent

UNITED STATES PATENTS

| Number | Name | Date |
|---|---|---|
| 1,780,660 | Wallace | Nov. 4, 1930 |
| 2,263,710 | Wallace | Nov. 25, 1941 |
| 2,379,388 | Thornhill | June 26, 1945 |
| 2,396,318 | De Bell | Mar. 12, 1946 |
| 2,443,587 | Tack | June 15, 1948 |